US012501486B2

(12) United States Patent
Lei et al.

(10) Patent No.: US 12,501,486 B2
(45) Date of Patent: Dec. 16, 2025

(54) METHODS AND APPARATUS FOR SHARING CHANNEL OCCUPANCY TIME FOR SIDELINK TRANSMISSION

(71) Applicant: Lenovo (Beijing) Limited, Beijing (CN)

(72) Inventors: Haipeng Lei, Beijing (CN); Lianhai Wu, Beijing (CN); Xiaodong Yu, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 401 days.

(21) Appl. No.: 18/042,356

(22) PCT Filed: Aug. 21, 2020

(86) PCT No.: PCT/CN2020/110509
§ 371 (c)(1),
(2) Date: Feb. 21, 2023

(87) PCT Pub. No.: WO2022/036688
PCT Pub. Date: Feb. 24, 2022

(65) Prior Publication Data
US 2023/0362995 A1 Nov. 9, 2023

(51) Int. Cl.
*H04W 74/0816* (2024.01)
*H04W 52/36* (2009.01)
*H04W 76/20* (2018.01)

(52) U.S. Cl.
CPC ..... *H04W 74/0816* (2013.01); *H04W 52/367* (2013.01); *H04W 76/20* (2018.02)

(58) Field of Classification Search
CPC ............. H04W 52/146; H04W 52/242; H04W 52/367; H04W 74/0808; H04W 74/0816; H04W 76/20
See application file for complete search history.

(56) References Cited

U.S. PATENT DOCUMENTS

2021/0185719 A1\* 6/2021 Xue ................. H04W 74/0816
2021/0259016 A1\* 8/2021 Damnjanovic ... H04W 74/0808
(Continued)

FOREIGN PATENT DOCUMENTS

| CN | 110784874 A | 2/2020 |
| WO | 2020089709 A1 | 5/2020 |

(Continued)

OTHER PUBLICATIONS

Intel Corporation, "Enhancements to configured grants for NR-unlicensed", 3GPP TSG RAN WG1 Meeting #99, R1-1912200, Reno, USA [retrieved Feb. 19, 2023]. Retrieved from the Internet <https://www.3gpp.org/ftp/tsg_ran/WG1_RL1/TSGR1_99/Docs>., Nov. 2019, 14 Pages.

(Continued)

*Primary Examiner* — Awet Haile
(74) *Attorney, Agent, or Firm* — FIG. 1 Patents

(57) ABSTRACT

Embodiments of the present disclosure relate to methods and apparatuses for sharing channel occupancy time for sidelink transmission. According to an embodiment of the present disclosure, a method performed by a first user equipment (UE) for wireless communication may include: determining an energy detection threshold for performing a Type-1 channel access procedure; performing the Type-1 channel access procedure based on the energy detection threshold; initiating a channel occupancy time (COT) in response to the Type-1 channel access procedure being successful; and transmitting an indicator for indicating the energy detection threshold within the COT.

20 Claims, 5 Drawing Sheets

(56) References Cited

U.S. PATENT DOCUMENTS

2021/0400721 A1* 12/2021 Luo ................. H04W 80/02
2021/0410185 A1* 12/2021 Do .................. H04W 74/0808
2022/0279577 A1*  9/2022 Zhang .............. H04W 72/23

FOREIGN PATENT DOCUMENTS

WO       2020162804  A1    8/2020
WO       2020164439  A1    8/2020

OTHER PUBLICATIONS

PCT/CN2020/110509, "International Preliminary Report on Patentability", PCT Application No. PCT/CN2020/110509, Mar. 2, 2023, 6 pages.
PCT/CN2020/110509, "International Search Report and Written Opinion", PCT Application No. PCT/CN2020/110509, May 25, 2021, 7 pages.

* cited by examiner

METHODS AND APPARATUS FOR SHARING CHANNEL OCCUPANCY TIME FOR SIDELINK TRANSMISSION

TECHNICAL FIELD

Embodiments of the present disclosure are related to wireless communication technologies, and more particularly, related to methods and apparatuses for sharing channel occupancy time for sidelink transmission, e.g., on an unlicensed spectrum.

BACKGROUND

In a new radio (NR) communication system, a transmitting user equipment (UE), hereinafter referred to as a "Tx UE," may send a sidelink transmission to a specific receiving UE (hereinafter referred to as an "Rx UE") in a unicast mode, to a group of Rx UEs in a groupcast mode, or to Rx UEs within a range in a broadcast mode. When an unlicensed spectrum is used for sidelink transmissions, in order to achieve fair coexistence with other wireless systems, a channel access procedure, also named "listen before talk" (LBT) procedure, is required before any sidelink transmission on the unlicensed spectrum. Only when the LBT procedure is successful, a Tx UE can initiate a channel occupancy time (COT) for sidelink transmission.

If the sidelink transmission performed by the Tx UE is completed before the COT initiated by the Tx UE ends, the remaining time domain resource(s) in the COT can be shared to one or more Rx UEs for sidelink transmission. It is desirable to improve a method for implementing the COT sharing for sidelink transmission.

SUMMARY OF THE DISCLOSURE

According to an embodiment of the present disclosure, a method performed by a first UE for wireless communication may include: determining an energy detection threshold for performing a Type-1 channel access procedure; performing the Type-1 channel access procedure based on the energy detection threshold; initiating a COT in response to the Type-1 channel access procedure being successful; and transmitting an indicator for indicating the energy detection threshold within the COT.

According to another embodiment of the present disclosure, a method performed by a first UE for wireless communication may include: receiving, from a second UE, an indicator for indicating an energy detection threshold; and performing a Type-2 channel access procedure based on the energy detection threshold within a COT initiated by the second UE.

According to yet another embodiment of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
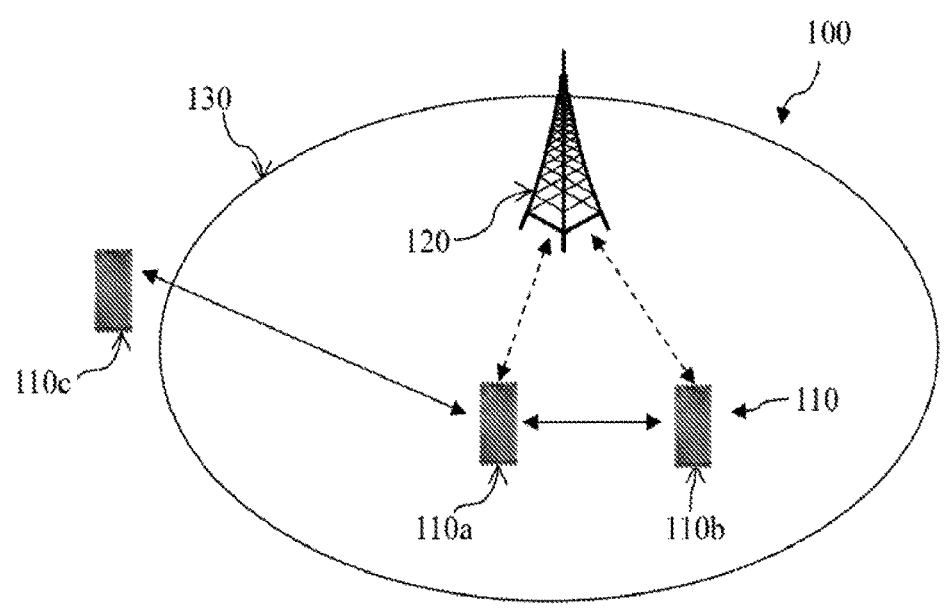
FIG. 1 illustrates a schematic diagram of a wireless communication system according to some embodiments of the present disclosure.

FIG. 1 illustrates a schematic diagram of a wireless communication system 100 according to some embodiments of the present disclosure.

As shown in FIG. 1, a wireless communication system 100 may include at least one BS (e.g., BS 120) and at least one UE 110 (e.g., UE 110a, UE 110b, and UE 110c). Although a specific number of UEs 110 and one BS 120 are depicted in FIG. 1, it is contemplated that the wireless communication system 100 may also include more BSs and more or fewer UEs in and outside of the coverage of the BSs.

The wireless communication system 100 can be compatible with any type of network that is capable of sending and receiving wireless communication signals. For example, the wireless communication system 100 can be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The UEs 110 and the BS 120 may support communications based on, for example, 3G, LTE, LTE-advanced (LTE-A), NR, or other suitable protocol(s). In some embodiments of the present disclosure, the BS 120 may also be referred to as an access point, an access terminal, a base, a macro cell, a node-B, an enhanced node B (eNB), a gNB, a home node-B, a relay node, or a device, or described using other terminology used in the art. The UE 110a, UE 110b, or UE 110c may include, for example, but is not limited to, a computing device, a wearable device, a mobile device, an IoT (Internet of Things) device, a vehicle, etc. Moreover, the UE 110a, UE 110b, or UE 110c may be referred to as a subscriber unit, a mobile, a mobile station, a user, a terminal, a mobile terminal, a wireless terminal, a subscriber station, a user terminal, or a device, or described using other terminology used in the art. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific base station 120 shown in FIG. 1 and can be any one of the base stations 120 in a wireless communication system, and some UEs (e.g., UE 110c) are outside of the coverage of the BS 120. For example, in the case that the wireless communication system includes two BSs 120, a UE 110 being within the coverage of any one of the two BSs 120 means that the UE 110 is within the coverage of a BS 120 (i.e., in-coverage) in the wireless communication system; and a UE 110 being outside of the coverage of both BSs 120 means that the UE 110 is outside of the coverage of a BS 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other via a sidelink (denoted by solid arrow in FIG. 1), and may form a UE group. During a sidelink communication, a Tx UE may transmit signaling, data, or both to an Rx UE. For example, referring to FIG. 1, a Tx UE (e.g., UE 110a) may transmit data to an Rx UE (e.g., UE 110b or UE 110c).

BSs (e.g., BS 120 in FIG. 1) and UEs (e.g., UE 110a, UE 110b, and UE 110c in FIG. 1) may operate in both a licensed spectrum and an unlicensed spectrum. For example, the unlicensed spectrum may be at around 6 GHz or 60 GHz of carrier frequency. An NR-U (NR system access on unlicensed spectrum) operating bandwidth may be an integer multiple of 20 MHz. For a bandwidth larger than 20 MHz, e.g., 40 MHz, 60 MHz, 80 MHz, or 100 MHz, the carrier bandwidth may be partitioned into subbands, each of which has a bandwidth of 20 MHz and may be indexed.

When an unlicensed spectrum is applied, in order to achieve fair coexistence with other wireless systems, a channel access procedure (or LBT) is required before a transmission (no matter an uplink transmission or a downlink transmission) on the unlicensed spectrum. The channel access procedure is a procedure based on channel sensing that evaluates the availability of a channel for performing the transmission. The basic unit for channel sensing is a sensing slot with a duration $T_{sl}$ (e.g., 9 μs). The sensing slot is considered to be idle if a BS or a UE senses the channel (i.e., detecting an energy on the channel) during the sensing slot, and determines that the detected energy for at least, for example, 4 μs within the sensing slot is less than an energy detection threshold $X_{Thresh}$. Otherwise, the sensing slot is considered to be busy.

A channel occupancy (CO) refers to transmission(s) on a channel by BS(s) or UE(s) after performing a corresponding Type-1 channel access procedure. The Type-1 channel access procedure is also named "LBT Category 4" or "LBT Cat.4" during standardization. A channel occupancy time (COT) refers to a total time for which a BS or UE and any other BS(s) or UE(s) sharing the channel occupancy perform transmission(s) on a channel after the BS or UE performs a corresponding Type-1 channel access procedure. A COT can be shared for transmissions between a BS and corresponding UE(s). The duration of a maximum channel occupancy time (MCOT) is dependent on a corresponding channel access priority class (CAPC) value and whether any other technology (e.g., WiFi) sharing the same unlicensed spectrum exists or not.

In NR-U, when a BS (e.g., a gNB) intends to initiate a COT for downlink transmission, a Type-1 downlink channel access procedure is performed on a channel. As long as the Type-1 downlink channel access procedure is successful, the BS can start downlink transmission(s) on the channel and occupy the channel within the COT. If the downlink transmission(s) is completed before the COT ends, the remaining time domain resource(s) in the COT can be shared to UE(s) for uplink transmission, e.g., physical uplink control channel (PUCCH) transmission, scheduled physical uplink shared channel (PUSCH) transmission, or configured grant PUSCH transmission. Before transmitting a PUSCH or PUCCH inside of a BS-initiated COT, a UE needs to perform a Type-2 uplink channel access procedure. The Type-2 channel access procedure, also named "LBT Category 2" or "LBT Cat.2," is a simple procedure with one-shot energy detection within a 16 μs or at least 25 μs sensing interval. Due to the one-shot sensing, the completion time of the Type-2 uplink channel access procedure is predictable. Both Type-1 and Type-2 channel access procedures are specified in the 3GPP standard document TS37.213.

Figure 2:
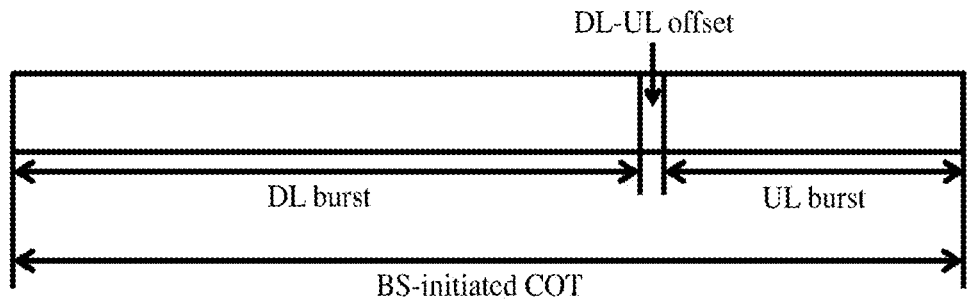
FIG. 2 illustrates exemplary base station (BS) initiated COT sharing for uplink transmission according to some embodiments of the present disclosure.

FIG. 2 illustrates exemplary BS-initiated COT sharing for uplink transmission according to some embodiments of the present disclosure. The BS-initiated COT may include a downlink (DL) burst in which DL transmission(s) is performed and an uplink (UL) burst in which UL transmission(s) is performed. The UL burst may include a PUCCH, scheduled PUSCH, or configured grant PUSCH. There is a DL-UL offset between the DL burst and the UL burst, in which a Type-2 UL channel access procedure is performed.

In NR-U, when a UE intends to initiate a COT for UL transmission, a Type-1 UL channel access procedure is performed on a channel. As long as the Type-1 UL channel access procedure is successful, the UE can start UL transmission(s) on the channel and occupy the channel within the COT. If the UL transmission(s) is completed before the COT ends, the remaining time domain resource(s) in the COT can be shared to a BS (e.g., a gNB) for DL transmission, e.g., physical downlink control channel (PDCCH) transmission, unicast physical downlink shared channel (PDSCH) transmission to the UE, or broadcast PDSCH transmission. Before transmitting a PDCCH or PDSCH inside of a UE-initiated COT, a BS needs to perform a Type-2 DL channel access procedure. The completion time of the Type-2 DL channel access procedure is also predictable due to one-shot sensing.

Figure 3:
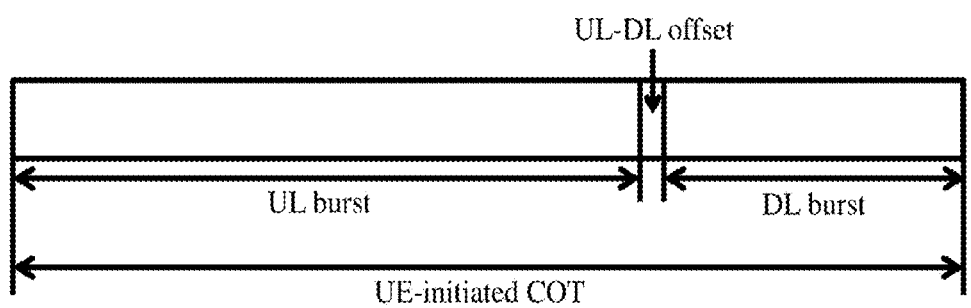
FIG. 3 illustrates exemplary UE-initiated COT sharing for downlink transmission according to some embodiments of the present disclosure.

FIG. 3 illustrates exemplary UE-initiated COT sharing for DL transmission according to some embodiments of the present disclosure. The UE-initiated COT may include a UL burst in which UL transmission(s) is performed and a DL burst in which DL transmission(s) is performed. The DL burst may include a PDCCH, unicast PDSCH, or broadcast PDSCH. There is a UL-DL offset between the UL burst and the DL burst, in which a Type-2 DL channel access procedure is performed.

Figure 4:
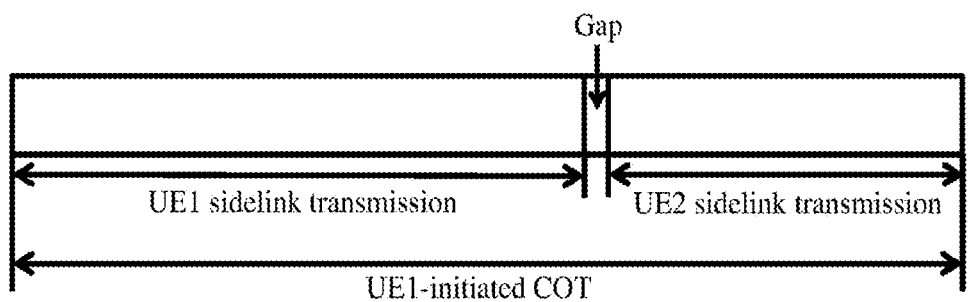
FIG. 4 illustrates exemplary UE-to-UE COT sharing for sidelink transmission according to some embodiments of the present disclosure.

When an unlicensed spectrum is used for sidelink transmission, a channel access procedure is also required before any sidelink transmission on the unlicensed spectrum. It does make sense that a Tx UE initiated COT can be shared to one or more Rx UEs. FIG. 4 illustrates exemplary UE-to-UE COT sharing for sidelink transmission according to some embodiments of the present disclosure. After initiating a COT by performing a Type-1 channel access procedure, a Tx UE, named UE1 for simplicity in FIG. 4, performs contiguous sidelink transmission(s) without any gap in time domain, and then shares the remaining time domain resource (s) in the COT to an Rx UE, named UE2 for simplicity in FIG. 4, for sidelink transmission. Upon reception of COT sharing information from the Tx UE, the Rx UE performs a Type-2 channel access procedure during a gap after the sidelink transmission(s) from the Tx UE is completed, and performs sidelink transmission(s) within the UE1-initiated COT when the Type-2 channel access procedure is successful.

Furthermore, before performing a Type-1 channel access procedure, a Tx UE needs to determine an energy detection threshold $X_{Thresh}$. In each sensing slot with a duration of Ts (e.g., 9 µs), the Tx UE may compare the received power or energy with the determined energy detection threshold $X_{Thresh}$ in order to determine whether the sensing slot is idle or busy. The determination of the energy detection threshold is essential for channel access. Generally, when a higher energy detection threshold is used in the channel access procedure, a higher probability of success for the channel access procedure can be achieved, while higher mutual interference among multiple transmissions may occur, which may lead to a throughput loss. On the other hand, when one or more other wireless technologies (e.g., WiFi) are also operating on the same unlicensed spectrum, if an NR sidelink transmission adopts a higher energy detection threshold, then it is not fair for coexistence among multiple radio access technologies (RATs).

For UE-to-UE COT sharing, as mentioned above, an Rx UE may perform a Type-2 channel access procedure when using the shared COT initiated by a Tx UE for sidelink transmission. Before performing the Type-2 channel access procedure, the Rx UE also needs to determine an energy detection threshold. If the Rx UE adopts an energy detection threshold higher than that used by the Tx UE for initiating the COT, it is against the spirit of fair coexistence and may bring higher interference to other UE(s) or other RAT(s).

For the purpose of fair coexistence, when a Tx UE shares a COT initiated by the Tx UE to an Rx UE, the Rx UE should adopt an energy detection threshold which is less than or equal to the energy detection threshold adopted by the Tx UE for initiating the COT. In this way, low interference to other UE(s) or other RAT(s) can be maintained.

The energy detection threshold adopted by a Tx UE for initiating a COT is determined autonomously by the Tx UE based on the Tx UE's transmit power and bandwidth capability. It is desirable to indicate information related to the energy detection threshold which is used by a Tx UE for initiating a COT to other UE(s) (e.g., an Rx UE) when the Tx UE intends to share the COT to the other UE(s), such that the other UE(s) sharing the COT can determine and use an energy detection threshold which is less than or equal to the energy detection threshold used by the Tx UE for initiating the COT.

Embodiments of the present disclosure provide at least solutions for a Tx UE to indicate information related to its energy detection threshold to other UE(s) (e.g., an Rx UE) when the Tx UE intends to share its COT to the other UE(s).

Figure 5:
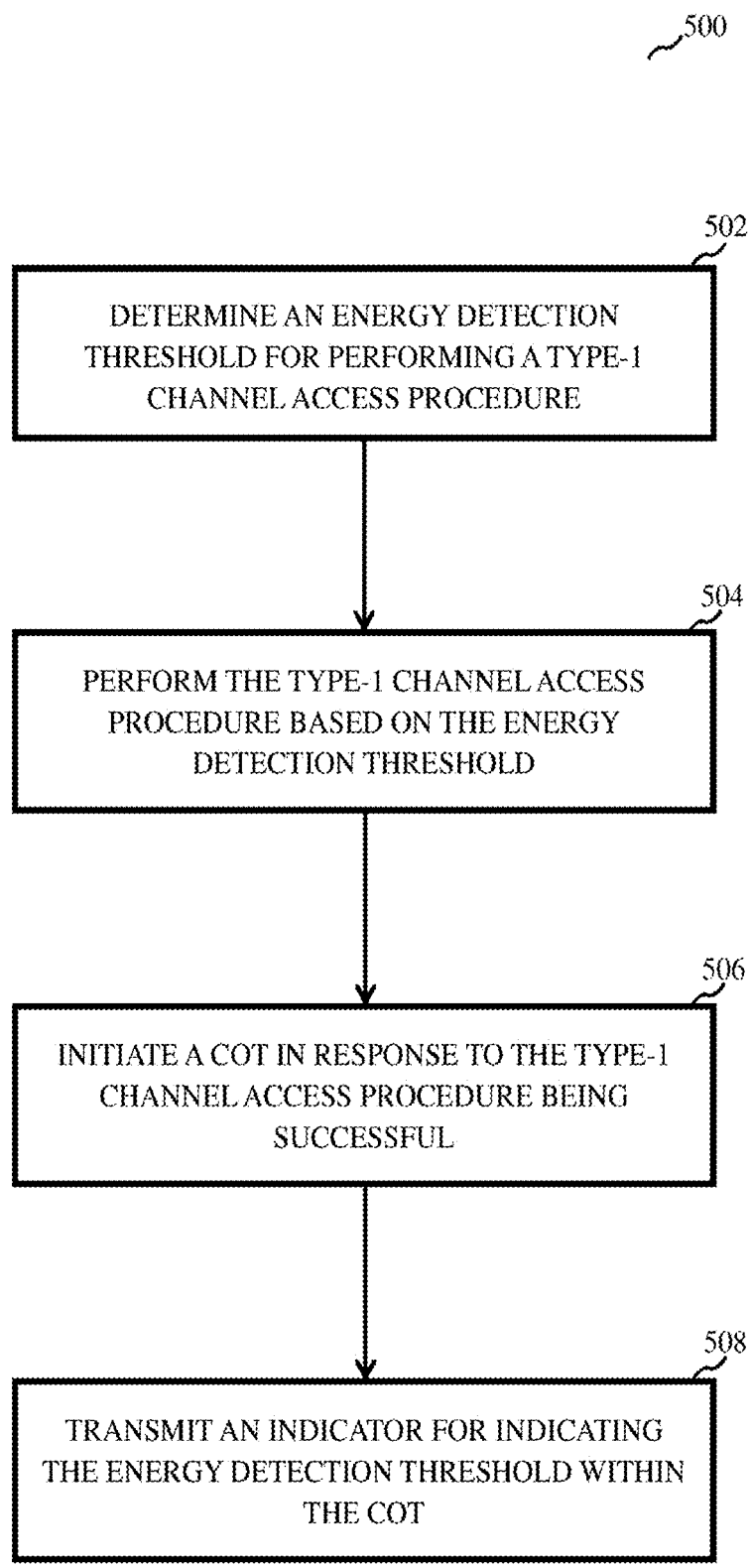
FIG. 5 illustrates an exemplary flow chart of a method for sharing a COT for sidelink transmission according to some embodiments of the present disclosure.

FIG. 5 illustrates an exemplary flow chart of a method 500 for sharing a COT for sidelink transmission according to some embodiments of the present disclosure. The method 500 may be performed by a first UE (e.g., a Tx UE) or other devices having similar functionality.

As shown in FIG. 5, the Tx UE may determine an energy detection threshold for performing a Type-1 channel access procedure at step 502.

According to some embodiments of the present disclosure, the energy detection threshold for the Tx UE to perform the Type-1 channel access procedure can be determined based on the transmit power of the Tx UE. From the regulatory point of view, a Tx UE with a lower transmit power can determine a higher energy detection threshold, which can be beneficial from a higher probability of success in accessing the channel. From the system operation point of view, a Tx UE is allowed to adjust or reduce its own transmit power in some scenarios, e.g., based on a pathloss between a BS (e.g., a gNB) and the Tx UE or a pathloss between the Tx UE and an Rx UE. The transmit power reduction can allow a higher probability of success in accessing the channel while reducing interference towards other nodes operating in the vicinity at the same time.

For example, the Tx UE may calculate its transmit power based on the following equations (1)-(3):

$$P_{PSSCH}(i) = \min(P_{CMAX}, P_{PSSCH,SL}(i))[dBm] \quad (1)$$

$$P_{PSSCH,SL}(i) = P_{O,SL} + 10\log_{10}(2^\mu \cdot M_{RB}^{PSSCH}(i)) + \alpha_{SL} \cdot PL_{SL}[dBm] \quad (2)$$

$$P_{PSCCH}(i) = 10\log_{10}\left(\frac{M_{RB}^{PSCCH}(i)}{M_{RB}^{PSSCH}(i)}\right) + P_{PSSCH}(i)[dBm] \quad (3)$$

where i represents the slot index, $P_{PSSCH}$ represents the transmit power for a physical sidelink shared channel (PSSCH), $P_{PSCCH}$ represents the transmit power for a physical sidelink control channel (PSCCH), $P_{CMAX}$ represents the power class (i.e., the maximum transmit power) of the Tx UE, $P_{O,SL}$ represents the parameter configured by high layer signaling for adjusting a target signal to noise ratio, y represents the subcarrier spacing, $$M_{RB}^{PSSCH}$$

represents the number of resource blocks used for transmitting the PSSCH, $$M_{RB}^{PSCCH}$$

represent's the number of resource blocks used for transmitting the PSCCH, $\alpha_{SL}$ represents the pathloss compensation factor which is configured by high layer signaling, and $PL_{SL}$ represents the pathloss between a BS (e.g., a gNB) and the Tx UE or the pathloss between the Tx UE and an Rx UE. The transmit power in the above equations is in the unit of dBm.

For example, the Tx UE may calculate its energy detection threshold for performing the Type-1 channel access procedure based on the following equation (4) in the case that the absence of other wireless systems on the same carrier cannot be guaranteed:

$$X'_{Thresh\_max} = \max\left\{\begin{matrix}-72 + 10\cdot\log10(BW\text{ MHz}/20\text{ MHz})dBm,\\ \min\left\{\begin{matrix}T_{max},\\ T_{max} - T_A + (P_H + 10\cdot\log10(BW\text{ MHz}/20\text{ MHz}) - P_{TX})\end{matrix}\right\}\end{matrix}\right\} \quad (4)$$

where $X'_{Thresh\_max}$ represents the maximum energy detection threshold of the Tx UE, BWMHz represents the single channel bandwidth in MHz, $T_{max}$(dBm)=10·log 10 (3.16228·10$^{-8}$(mW/MHz)·BWMHz (MHz)) $T_A$=10 dB, $P_H$=23 dBm, and $P_{TX}$ is set to $P_{PSSCH}$(i). The Tx UE may determine an energy detection threshold less than or equal to the calculated $X'_{Thresh\_max}$.

According to some embodiments of the present disclosure, the energy detection threshold for the Tx UE to perform the Type-1 channel access procedure can be determined based on the power class (i.e., the maximum transmit power) of the Tx UE. In these cases, the energy detection threshold can also be calculated based on the above equation (4), except that $P_{TX}$ is set to Pcmax.

It should be understood that the above equations for calculating the transmit power and energy detection threshold are provided for purpose of illustration and not intended to limit the scope of the present disclosure.

As shown in FIG. 5, after determining the energy detection threshold, the Tx UE may perform the Type-1 channel access procedure based on the determined energy detection threshold at step 504. In response to the Type-1 channel access procedure being successful, the Tx UE may initiate a COT at step 506.

When the Tx UE intends to share the COT to other UE(s), e.g., an Rx UE, the Tx UE may transmit, at step 508, an indicator for indicating the energy detection threshold determined at step 502 within the COT. According to some embodiments of the present disclosure, the indicator can be carried in a medium access control (MAC) layer control element (CE), sidelink control information (SCI), or radio resource control (RRC) signaling from a BS or the Tx UE. The Tx UE may transmit the indicator in each slot of the COT. The indicator can be transmitted to one or more Rx UEs.

According to some embodiments of the present disclosure, the indicator transmitted at step 508 may indicate the energy detection threshold determined at step 502. When the Tx UE does not intend to share its COT, the Tx UE may transmit a predefined invalid value of energy detection threshold, e.g., a non-numerical value.

In an embodiment of the present disclosure, the indicator transmitted at step 508 may indicate an absolute threshold value (e.g., in the unit of dBm) of the energy detection threshold determined at step 502. The absolute threshold value can be indicated in a MAC CE or RRC signaling. For example, the indicator having a value of −72 may correspond to the energy detection threshold of −72 dBm, the indicator having a value of −62 may correspond to the energy detection threshold of −62 dBm, and so on. Alternatively, a set of possible absolute energy detection threshold values (e.g., −82 dBm, −77 dBm, −72 dBm, −67 dBm, −62 dBm, −57 dBm, etc.) can be preconfigured by RRC signaling or predefined in standards, and the Tx UE may select a most appropriate value from the set. Each value in the set may correspond to a code point. The Tx UE may transmit the code point corresponding to the selected value as the indicator for indicating the energy detection threshold, e.g., in the SCI.

In another embodiment of the present disclosure, the indicator transmitted at step 508 may indicate a relative threshold value (e.g., in the unit of dB) of the energy detection threshold determined at step 502. The relative threshold value is an offset to a maximum energy detection threshold value which can be determined based on the maximum transmit power of the Tx UE. The relative threshold value can be indicated in a MAC CE or RRC signaling. For example, the indicator having a value of −13 may correspond to the relative threshold value of −13 dB, the indicator having a value of −12 may correspond to the relative threshold value of −12 dB, and so on. Alternatively, a set of possible relative threshold values (i.e., energy detection threshold offset values) (e.g., −15 dB, −14 dB, −13 dB, −12 dB, −11 dB, −10 dB, etc.) can be preconfigured by RRC signaling or predefined in standards, and the Tx UE may select a most appropriate value from the set. Each value in the set may correspond to a code point. The Tx UE may transmit the code point corresponding to the selected value as the indicator for indicating the energy detection threshold, e.g., in SCI.

In the cases that the Tx UE determines the energy detection threshold based on its power class, according to some embodiments of the present disclosure, the indicator transmitted at step 508 may indicate the power class of the Tx UE. When the Tx UE does not intend to share its COT, the Tx UE may transmit a predefined invalid value of power class, e.g., a non-numerical value.

In an embodiment of the present disclosure, a set of possible power classes can be preconfigured by RRC signaling or predefined in standards. For example, the set of possible power classes may include existing UE power classes such as 23 dBm, 26 dBm, 31 dBm, etc. Alternatively or additionally, the set of possible power classes may include new power classes such as 16 dBm, 20 dBm, etc., for a low power or low capable UE, e.g., a wearable device. Each power class in the set may correspond to a code point. The Tx UE may transmit the code point corresponding to its power class as the indicator for indicating the energy detection threshold, e.g., in a MAC CE, SCI, or RRC signaling. For example, when there are N power classes in the set, [$\log_2$ N] bits in SCI are required for indicating the power class of the Tx UE. Alternatively, the [$\log_2$ N] bits can be contained in a MAC CE or configured by RRC signaling.

In the cases that the Tx UE determines the energy detection threshold based on its transmit power, according to some embodiments of the present disclosure, the indicator transmitted at step 508 may indicate the transmit power of the Tx UE. When the Tx UE does not intend to share its COT, the Tx UE may transmit a predefined invalid value of transmit power, e.g., a non-numerical value.

In an embodiment of the present disclosure, the indicator transmitted at step 508 may indicate an absolute power value (e.g., in the unit of dBm) of the transmit power of the Tx UE. The absolute power value can be indicated in a MAC CE or RRC signaling. For example, the indicator having a value of −72 may correspond to the transmit power of −72 dBm, the indicator having a value of −62 may correspond to the transmit power of −62 dBm, and so on. Alternatively, a set of possible absolute transmit power values (e.g., −82 dBm, −77 dBm, −72 dBm, −67 dBm, −62 dBm, −57 dBm, etc.) can be preconfigured by RRC signaling or predefined in standards, and the Tx UE may select a most appropriate value from the set. Each value in the set may correspond to a code point. The Tx UE may transmit the code point corresponding to the selected value as the indicator for indicating the energy detection threshold, e.g., in the SCI.

In another embodiment of the present disclosure, the indicator transmitted at step 508 may indicate a relative power value (e.g., in the unit of dB) of the transmit power of the Tx UE. The relative power value is an offset to a maximum transmit power value of the Tx UE. The relative power value can be indicated in a MAC CE or RRC signaling. For example, the indicator having a value of −13 may correspond to the relative power value of −13 dB, the indicator having a value of −12 may correspond to the relative power value of −12 dB, and so on. Alternatively, a set of possible relative power values (i.e., transmit power offset values) (e.g., −15 dB, −14 dB, −13 dB, −12 dB, −11 dB, −10 dB, etc.) can be preconfigured by RRC signaling or predefined in standards, and the Tx UE may select a most appropriate value from the set. Each value in the set may correspond to a code point. The Tx UE may transmit the code point corresponding to the selected value as the indicator for indicating the energy detection threshold, e.g., in SCI.

In the cases that the Tx UE determines the energy detection threshold based on its transmit power, according to some embodiments of the present disclosure, the indicator transmitted at step 508 may indicate a transmit power spectrum density (PSD) of the Tx UE. The transmit PSD can be calculated based on the transmit power and a channel bandwidth of the Tx UE. When the Tx UE does not intend to share its COT, the Tx UE may transmit a predefined invalid value of transmit PSD, e.g., a non-numerical value.

In an embodiment of the present disclosure, the indicator transmitted at step 508 may indicate an absolute PSD value of the transmit PSD of the Tx UE. The absolute PSD value can be indicated in a MAC CE or RRC signaling. Alternatively, a set of possible absolute transmit PSD values can be preconfigured by RRC signaling or predefined in standards, and the Tx UE may select a most appropriate value from the set. Each value in the set may correspond to a code point. The Tx UE may transmit the code point corresponding to the selected value as the indicator for indicating the energy detection threshold, e.g., in the SCI.

In another embodiment of the present disclosure, the indicator transmitted at step 508 may indicate a relative PSD value of the transmit PSD of the Tx UE. The relative PSD value is an offset to a maximum transmit PSD value of the Tx UE which can be determined based on the maximum transmit power of the Tx UE. The relative PSD value can be indicated in a MAC CE or RRC signaling. Alternatively, a set of possible relative PSD values (i.e., transmit PSD offset values) can be preconfigured by RRC signaling or predefined in standards, and the Tx UE may select a most appropriate value from the set. Each value in the set may correspond to a code point. The Tx UE may transmit the code point corresponding to the selected value as the indicator for indicating the energy detection threshold, e.g., in SCI.

Figure 6:
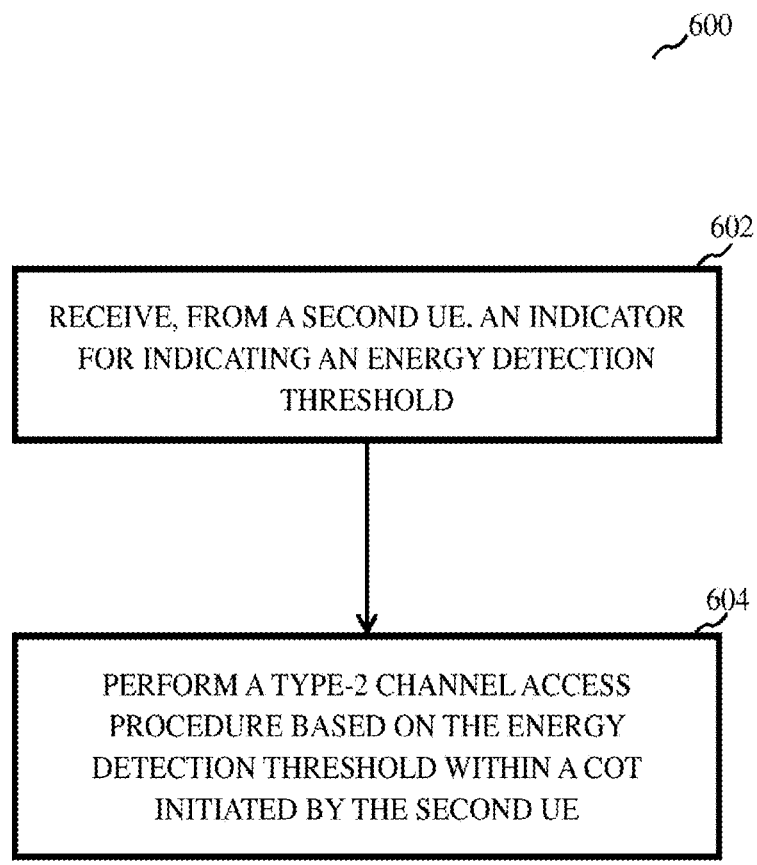
FIG. 6 illustrates an exemplary flow chart of another method for sharing a COT for sidelink transmission according to some embodiments of the present disclosure.

FIG. 6 illustrates an exemplary flow chart of a method 600 for sharing a COT for sidelink transmission according to some embodiments of the present disclosure. The method 600 may be performed by a first UE (e.g., an Rx UE) or other devices having similar functionality.

As shown in FIG. 6, the Rx UE may receive, from a second UE (e.g., a Tx UE), an indicator for indicating an energy detection threshold at step 602. The indicator can be carried in a MAC CE, SCI, or RRC signaling, and can be any indicator described above with respect to step 508 in FIG. 5. The energy detection threshold is used by the Tx UE for performing a channel access procedure to initiate a COT. At step 604, the Rx UE may perform a Type-2 channel access procedure based on the energy detection threshold within the COT initiated by the Tx UE. In the Type-2 channel access procedure, the Rx UE may use an energy detection threshold less than or equal to the energy detection threshold used by the Tx UE.

When the Type-2 channel access procedure is successful, the Rx UE may perform sidelink transmission(s) within the COT. In some embodiments of the present disclosure, when the indicator received at step 602 has a predefined invalid value, e.g., a non-numerical value, the Rx UE cannot perform the Type-2 channel access procedure or sidelink transmission(s) within the COT.

According to some embodiments of the present disclosure, the Rx UE may determine the energy detection threshold used by the Tx UE based on the indicator received at step 602. In the cases that the indicator indicates a power class of the Tx UE, the Rx UE may determine the energy detection threshold used by the Tx UE based on the power class (e.g., based on equation (4) in which $P_{TX}$ is set to the power class). In the cases that the indicator indicates a transmit power of the Tx UE, the Rx UE may determine the energy detection threshold used by the Tx UE based on the transmit power (e.g., based on equation (4) in which $P_{TX}$ is set to the transmit power). In the cases that the indicator indicates a transmit PSD of the Tx UE, the Rx UE may determine the energy detection threshold used by the Tx UE based on the transmit PSD. For example, the Rx UE may calculate a transmit power based on the transmit PSD and a channel bandwidth of the Tx UE and then calculate the energy detection threshold based on equation (4) in which $P_{TX}$ is set to the transmit power).

Figure 7:
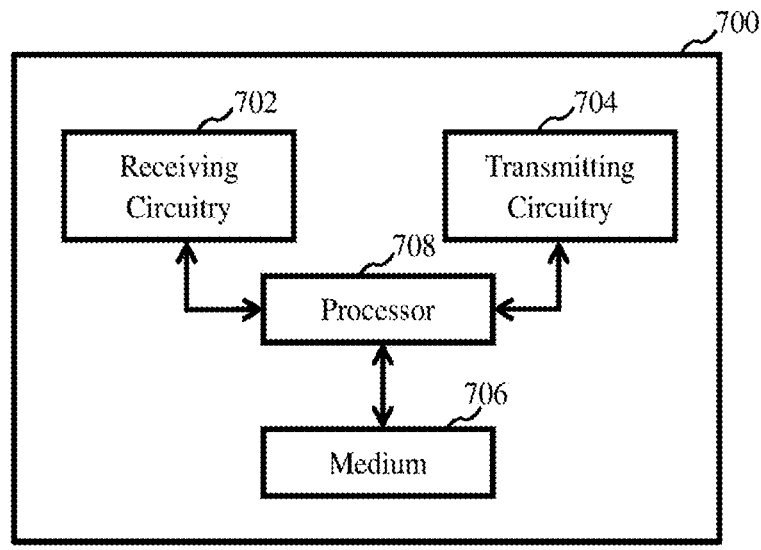
FIG. 7 illustrates an exemplary block diagram of an apparatus according to some embodiments of the present disclosure.

FIG. 7 illustrates an exemplary block diagram of an apparatus 700 according to some embodiments of the present disclosure. In some embodiments of the present disclosure, the apparatus 700 may be or include a Tx UE or other devices having similar functionality, which can at least perform the method illustrated in FIG. 5.

As shown in FIG. 7, the apparatus 700 may include at least one receiving circuitry 702, at least one transmitting circuitry 704, at least one non-transitory computer-readable medium 706, and at least one processor 708 coupled to the at least one receiving circuitry 702, the at least one transmitting circuitry 704, the at least one non-transitory computer-readable medium 706. While shown to be coupled to each other via the at least one processor 708 in the example of FIG. 7, the at least one receiving circuitry 702, the at least one transmitting circuitry 704, the at least one non-transitory computer-readable medium 706, and the at least one processor 708 may be coupled to one another in various arrangements. For example, the at least one receiving circuitry 702, the at least one transmitting circuitry 704, the at least one non-transitory computer-readable medium 706, and the at least one processor 708 may be coupled to each other via one or more local buses (not shown for simplicity).

Although in FIG. 7, elements such as receiving circuitry 702, transmitting circuitry 704, non-transitory computer-readable medium 706, and processor 708 are described in the singular, the plural is contemplated unless limitation to the singular is explicitly stated. In some embodiments of the present disclosure, the at least one receiving circuitry 702 and the at least one transmitting circuitry 704 are combined into a single device, such as a transceiver. In certain embodiments of the present disclosure, the apparatus 700 may further include an input device, a memory, and/or other components.

In some embodiments of the present disclosure, the at least one non-transitory computer-readable medium 706 may have stored thereon computer-executable instructions which are programmed to cause the at least one processor 708 to implement the steps of the methods according to embodiments of the present disclosure, for example as described in view of FIG. 5, with the at least one receiving circuitry 702 and the at least one transmitting circuitry 704. For example, when executed, the instructions may cause the at least one processor 708 to determine an energy detection threshold for performing a Type-1 channel access procedure, perform the Type-1 channel access procedure based on the energy detection threshold, and initiate a COT in response to the Type-1 channel access procedure being successful. The instructions may further cause the at least one processor 708 to transmit, with the at least one transmitting circuitry 704, an indicator for indicating the energy detection threshold within the COT.

Figure 8:
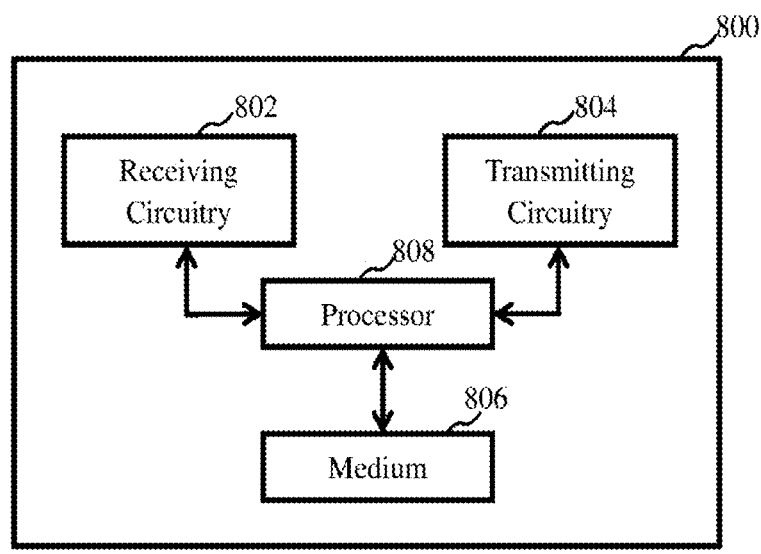
FIG. 8 illustrates an exemplary block diagram of another apparatus according to some embodiments of the present disclosure.

FIG. 8 illustrates an exemplary block diagram of an apparatus 800 according to some embodiments of the present disclosure. In some embodiments of the present disclosure, the apparatus 800 may be or include an Rx UE or other devices having similar functionality, which can at least perform the method illustrated in FIG. 6.

As shown in FIG. 8, the apparatus 800 may include at least one receiving circuitry 802, at least one transmitting circuitry 804, at least one non-transitory computer-readable medium 806, and at least one processor 808 coupled to the at least one receiving circuitry 802, the at least one transmitting circuitry 804, the at least one non-transitory computer-readable medium 806. While shown to be coupled to each other via the at least one processor 808 in the example of FIG. 8, the at least one receiving circuitry 802, the at least one transmitting circuitry 804, the at least one non-transitory computer-readable medium 806, and the at least one processor 808 may be coupled to one another in various arrangements. For example, the at least one receiving circuitry 802, the at least one transmitting circuitry 804, the at least one non-transitory computer-readable medium 806, and the at least one processor 808 may be coupled to each other via one or more local buses (not shown for simplicity).

Although in FIG. 8, elements such as receiving circuitry 802, transmitting circuitry 804, non-transitory computer-readable medium 806, and processor 808 are described in the singular, the plural is contemplated unless limitation to the singular is explicitly stated. In some embodiments of the present disclosure, the at least one receiving circuitry 802 and the at least one transmitting circuitry 804 are combined into a single device, such as a transceiver. In certain embodiments of the present disclosure, the apparatus 800 may further include an input device, a memory, and/or other components.

In some embodiments of the present disclosure, the at least one non-transitory computer-readable medium 806 may have stored thereon computer-executable instructions which are programmed to cause the at least one processor 808 to implement the steps of the methods according to embodiments of the present disclosure, for example as described in view of FIG. 6, with the at least one receiving circuitry 802 and the at least one transmitting circuitry 804. For example, when executed, the instructions may cause the at least one processor 808 to receive, with the at least one receiving circuitry 802, from a second UE (e.g., a Tx UE), an indicator for indicating an energy detection threshold. The instructions may further cause the at least one processor 808 to perform a Type-2 channel access procedure based on the energy detection threshold within a COT initiated by the Tx UE.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A first user equipment (UE) for wireless communication, comprising:
    at least one memory; and
    at least one processor coupled to the at least one memory, the at least one processor configured to cause the first UE to:
        determine an energy detection threshold for performing a Type-1 channel access procedure;
        perform the Type-1 channel access procedure based on the energy detection threshold;
        initiate a channel occupancy time (COT) in response to the Type-1 channel access procedure being successful, wherein the COT is shared with one or more second UEs; and
        transmit, within the COT and to the one or more second UEs, an indication of the energy detection threshold.

2. The first UE of claim 1, wherein the indication is carried in a medium access control (MAC) layer control element (CE), sidelink control information (SCI), or radio resource control (RRC) signaling.

3. The first UE of claim 1, wherein the energy detection threshold is determined based on a transmit power of the first UE.

4. The first UE of claim 3, wherein one or more of:
    the at least one processor is configured to cause the first UE to determine the transmit power based at least in part on a pathloss between the first UE and one or more of a base station or a second UE of the one or more second UEs;
    the indication indicates the energy detection threshold;
    the indication indicates an absolute threshold value of the energy detection threshold;
    the indication comprises a code point corresponding to the absolute threshold value among a set of absolute threshold values; or
    the set of absolute threshold values are one or more of configured by radio resource control (RRC) signaling or predefined.

5. The first UE of claim 3, wherein:
    the indication indicates a relative threshold value of the energy detection threshold which is an offset to a maximum energy detection threshold value,
    the indication comprises a code point corresponding to the relative threshold value among a set of relative threshold values, and
    the set of relative threshold values are one or more of configured by radio resource control (RRC) signaling or predefined.

6. The first UE of claim 3, wherein:
    the indication indicates the transmit power,
    the indication indicates an absolute power value of the transmit power,
    the indication comprises a code point corresponding to the absolute power value among a set of absolute power values, and
    the set of absolute power values are configured by one or more of radio resource control (RRC) signaling or predefined.

7. The first UE of claim 3, wherein:
    the indication indicates a relative power value of the transmit power which is an offset to a maximum transmit power value,
    the indication is a code point corresponding to the relative power value among a set of relative power values, and
    the set of relative power values are one or more of configured by radio resource control (RRC) signaling or predefined.

8. The first UE of claim 3, wherein:
    the indication indicates a transmit power spectrum density calculated based on the transmit power and a channel bandwidth,
    the indication indicates an absolute power spectrum density value of the transmit power spectrum density,
    the indication comprises a code point corresponding to the absolute power spectrum density value among a set of absolute power spectrum density values, and the set of absolute power spectrum density values are one or more of configured by radio resource control (RRC) signaling or predefined.

9. The first UE of claim 3, wherein:
the indication indicates a relative power spectrum density value of a transmit power spectrum density which is an offset to a maximum transmit power spectrum density value,
the indication is a code point corresponding to the relative power spectrum density value among a set of relative power spectrum density values, and
the set of relative power spectrum density values are one or more of configured by radio resource control (RRC) signaling or predefined.

10. The first UE of claim 1, wherein one or more of:
the energy detection threshold is determined based on a power class of the first UE;
the indication indicates the power class;
the indication comprises a code point corresponding to the power class among a set of power classes; or
the set of power classes are configured by one or more of radio resource control (RRC) signaling or predefined.

11. A first user equipment (UE) for wireless communication, comprising, comprising:
at least one memory; and
at least one processor coupled to the at least one memory, the at least one processor configured to cause the first UE to:
receive, from a second UE and within a channel occupancy time (COT) initiated by the second UE, an indication of an energy detection threshold; and
perform, within the COT initiated by the second UE, a Type-2 channel access procedure based on the energy detection threshold.

12. The first UE of claim 11, wherein one or more of:
the indication is carried in a medium access control (MAC) layer control element (CE), sidelink control information (SCI), or radio resource control (RRC) signaling,
the indication indicates the energy detection threshold,
the indication indicates an absolute threshold value of the energy detection threshold,
the indicator comprises a code point corresponding to the absolute threshold value among a set of absolute threshold values, or
the set of absolute threshold values are one or more of configured by radio resource control (RRC) signaling or predefined.

13. The first UE of claim 11, wherein:
the indication indicates a relative threshold value of the energy detection threshold which is an offset to a maximum energy detection threshold value,
the indication comprises a code point corresponding to the relative threshold value among a set of relative threshold values, and
the set of relative threshold values are one or more of configured by radio resource control (RRC) signaling or predefined.

14. The first UE of claim 11, wherein one or more of:
the indication indicates a power class of the second UE;
the at least one processor is configured to cause the first UE to calculate the energy detection threshold based on the power class;
the indication comprises a code point corresponding to the power class among a set of power classes; or the set of power classes are one or more of configured by radio resource control (RRC) signaling or predefined.

15. The first UE of claim 11, wherein the indication indicates a transmit power of the second UE, and wherein the at least one processor is configured to cause the first UE to calculate the energy detection threshold based on the transmit power.

16. The first UE of claim 15, wherein:
the indication indicates an absolute power value of the transmit power,
the indication comprises a code point corresponding to the absolute power value among a set of absolute power values, and
the set of absolute power values are one or more of configured by radio resource control (RRC) signaling or predefined.

17. The first UE of claim 15, wherein:
the indication indicates a relative power value of the transmit power which is an offset to a maximum transmit power value,
the indication comprises a code point corresponding to the relative power value among a set of relative power values, and
the set of relative power values are one or more of configured by radio resource control (RRC) signaling or predefined.

18. The first UE of claim 11, wherein one or more of:
the indication indicates a transmit power spectrum density of the second UE;
the at least one processor is configured to cause the first UE to calculate the energy detection threshold based on the transmit power spectrum density;
the indication indicates an absolute power spectrum density value of the transmit power spectrum density;
the indication comprises a code point corresponding to the absolute power spectrum density value among a set of absolute power spectrum density values; or
the set of absolute power spectrum density values are one or more of configured by radio resource control (RRC) signaling or predefined.

19. The first UE of claim 11, wherein:
the indication indicates a relative power spectrum density value of a transmit power spectrum density which represents an offset to a maximum transmit power spectrum density value,
the indication comprises a code point corresponding to the relative power spectrum density value among a set of relative power spectrum density values, and
the set of relative power spectrum density values are one or more of configured by radio resource control (RRC) signaling or predefined.

20. A method performed by a first user equipment (UE), the method comprising:
determining an energy detection threshold for performing a Type-1 channel access procedure;
performing the Type-1 channel access procedure based on the energy detection threshold;
initiating a channel occupancy time (COT) in response to the Type-1 channel access procedure being successful, wherein the COT is shared with one or more second UEs; and
transmitting, within the COT and to the one or more second UEs, an indication of the energy detection threshold.

* * * * *